United States Patent [19]
Seita et al.

[11] Patent Number: 4,964,991
[45] Date of Patent: Oct. 23, 1990

[54] FLAT PERMEABLE MEMBRANE AND FOR MANUFACTURE THEREOF

[75] Inventors: Yukio Seita, Fuji; Makoto Emi, Fujinomiya, both of Japan

[73] Assignee: Terumo Corporation, Tokyo, Japan

[21] Appl. No.: 85,317

[22] Filed: Aug. 12, 1987

Related U.S. Application Data

[63] Continuation of Ser. No. 796,434, Nov. 8, 1985, abandoned.

[30] Foreign Application Priority Data

Nov. 9, 1984 [JP] Japan .................. 69-236179

[51] Int. Cl.⁵ .......................... B01D 71/26
[52] U.S. Cl. .................. 210/500.36; 264/41; 210/654
[58] Field of Search ............ 210/500.36, 654; 428/220, 516, 523; 264/41

[56] References Cited

U.S. PATENT DOCUMENTS

| | | | |
|---|---|---|---|
| 3,351,495 | 11/1967 | Larsen et al. | 210/500.36 X |
| 3,729,332 | 4/1973 | Grubb et al. | 117/11 |
| 3,830,733 | 3/1972 | Spivack et al. | 210/22 |
| 3,937,758 | 2/1976 | Castagna | 525/245 |
| 4,197,148 | 4/1980 | Shinomura | 264/49 X |
| 4,206,050 | 6/1980 | Walch et al. | 210/23 R |
| 4,253,900 | 3/1981 | Dege et al. | 210/500.36 X |
| 4,401,567 | 8/1983 | Shindo et al. | 210/500.36 X |
| 4,438,850 | 3/1984 | Kahn | 206/634 |
| 4,539,256 | 4/1985 | Shipman | 264/49 X |
| 4,613,441 | 8/1986 | Kohno et al. | 210/500.36 |
| 4,743,375 | 5/1988 | Seita et al. | 210/500.36 |

FOREIGN PATENT DOCUMENTS

| | | |
|---|---|---|
| 108601 | 5/1984 | European Pat. Off. . |
| 1546657 | 7/1970 | Fed. Rep. of Germany . |
| 2625681 | 3/1977 | Fed. Rep. of Germany . |
| 2751075 | 6/1978 | Fed. Rep. of Germany . |
| 2722025 | 11/1978 | Fed. Rep. of Germany . |
| 3118924 | 4/1982 | Fed. Rep. of Germany . |
| 7617618 | 1/1977 | France . |
| 0142860 | 2/1985 | Japan .................. 210/500.36 |
| 1051320 | 12/1966 | United Kingdom ........ 210/500.36 |
| 1078895 | 8/1967 | United Kingdom . |
| 2115425 | 9/1983 | United Kingdom . |

OTHER PUBLICATIONS

EPO 0108601—5/16/84.
EPO 0105629—4/18/84.

*Primary Examiner*—Frank Spear
*Attorney, Agent, or Firm*—Cushman, Darby and Cushman

[57] ABSTRACT

A flat permeable membrane of polyolefin 10 to 500 μm in thickness, which membrane has compact layers of intimately bound fine particles of polyolefin formed one each in the opposite surface regions of the membrane and a layer of an aggregate of fine discrete particles of an average diameter of 0.01 to 5 μm formed between the compact layers and, consequently, has fine through pores labyrinthically extended in the direction of thickness of the membrane to establish communication between the opposite surfaces of the membrane and a method for the manufacture of the permeable membrane.

18 Claims, 5 Drawing Sheets

FLAT PERMEABLE MEMBRANE AND FOR MANUFACTURE THEREOF

This is a continuation of application Ser. No. 796,434, filed Nov. 8, 1985, which was abandoned upon the filing hereof.

BACKGROUND OF THE INVENTION

1. Field of the Invention

This invention relates to a permeable membrane and a method for the manufacture thereof. Particularly, this invention relates to a permeable membrane useful as for filtration of blood plasma and a method for the manufacture of the permeable membrane. To be more particular, this invention relates to a permeable membrane possessed of pores of a controlled diameter and enabled to provide efficient removal of pathogenic macromolecules, ensure recovery of albumin in a high ratio and permit efficient treatment of a large amount of blood plasma and to a method for the manufacture of the permeable membrane.

2. Description of Prior Art

Heretofore, various permeable membranes have been used for the separation of whole blood into blood corpuscles and blood plasma. For example, the permeable membrane for the separation of blood plasma is used for the preparation of a blood plasma medicament for transfusion, for the pretreatment of an artificial kidney, and for the therapy resorting to change of blood plasma. The therapy by the change of blood plasma has been demonstrated to be effective against such auto-immunizing diseases as hepatic insufficiency, serious myasthenia, and chronic arthrorheumatism. This therapy is effectively carried out by separating the whole blood from the patient into blood corpuscles and blood plasma, then discarding the blood plasma containing a pathogenic substance, and adding to the blood corpuscles the blood plasma taken from a healthy man or a blood plasma medicament. The use of the blood plasma medicament entails such problems as the difficulty in the procurement of the medicament itself and the possibility of evil effect of infections factor. Thus, the method which comprises clarifying the blood plasma separated from the patient's own whole blood and recombining the clarified blood plasma with the blood corpuscles also separated from the whole blood proves desirable. The desirability of developing a membrane effective for the purpose of this separation is urged.

As membranes useful for such separation of blood plasma as described above, regenerated cellulose membrane, cellulose acetate membrane, polyvinyl calcohol membrane, polysulfone membrane, polymethyl methacrylate membrane, etc. have been known to the art. These high molecular membranes are deficient in mechanical strength, pore diameter of membrane, capacity for treatment of blood plasma, etc. Most of them are impervious to albumin which is beneficial to the human system, pervious not only to albumin but also to pathogenic macromolecules, or susceptible of early clogging and, therefore, incapable of removing pathogenic macromolecules in a sufficient amount. The term "pathogeric macromolecule" as used herein means immune globulin M (IgM, Mw about 950,000), low density ripoprotein (LDL, Mw about 1,200,000 to 3,300,000), immune complexes, rheumatic factor, etc. which have larger molecular weights than albumin. For the purpose of removing pathogenic macromolecules aimed at and returning albumin as a beneficial blood plasma component to the patient's system, it is necessary to use a separation membrane which possesses desired pore diameter and porosity and a membranous texture difficult to clog, and permits clarification of a large amount of blood plasma.

As a separation membrane for the removal of blood plasma components of medium to high molecular weights, there has been proposed a porous polyethylene hollow-fiber membrane which is made of high-density polyethylene having a density of at least 0.955 g/cm$^3$, possessed of a multiplicity of fine pores penetrating the wall thereof from the inner wall surface through the outer wall surface of the hollow fiber, oriented in the direction of length of the hollow fiber, and possessed of a porosity in the range of 30 to 90% by volume (Japanese Patent Laid-open SHO 58(1983)-75,555). In the hollow fiber membrane described above, since the fine pores are mechanically formed by cold drawing a high-orientation blood plasma type unstretched hollow fiber and subsequently hot drawing the cold drawn hollow fiber and, moreover, the fine pores so formed are substantially straight and substantially uniform in diameter from the inner wall surface through the outer wall surface, the pore density per unit volume cannot be increased and the capacity for blood plasma treatment per unit surface area is small and the ratio of recovery of albumin is low. Further, the membrane is readily fractured by orientation and is heavily deformed and shrunken by the intense heat as generated during the sterilization with an autoclave, for example.

A hollow fiber made of a vinyl alcohol type polymer and possessed of a compacted layer on at least one of the opposite surfaces of the hollow fiber membrane and a porous layer in the interior of the web of the hollow fiber membrane has been proposed (U.S. Pat. No. 4,402,940). Since the hollow fiber membrane of this type is obtained by spinning the solution of the vinyl alcohol type polymer, however, it suffers from the disadvantage that the pore density per unit volume cannot be increased, the capacity for blood plasma treatment per unit volume is small, the pathogenic macromolecules cannot be sufficiently removed, and the ratio of recovery of albumin, etc. is low.

There has been proposed a permeable membrane which is produced by preparing a mixture of a polymer such as crystalline polyolefin or polyamide which is sparingly soluble in a solvent and is stretchable with a compound which is partially compatible with the polymer and is readily soluble in a solvent, molding the mixture in the form of film, sheet, or hollow member, treating the molded mixture with a solvent, drying the wet molded mixture, and stretching the dried molded mixture monoaxially or biaxially at an elongation of 50 to 1,500% (U.S. Pat. No. 4,100,238). Since this membrane is stretched exclusively for the purpose of enlarging the pores in diameter, it exhibits low mechanical strength and poor durability. Further since the pores are substantially uniform in structure in the opposite surfaces and in the interior and the polymer crystals are coarse, it separates the components of medium to high molecular weights with difficulty despite its low strength.

It is, therefore, an object of this invention to provide a novel permeable membrane and a method for the manufacture of this permeable membrane.

Another object of this invention is to provide a permeable membrane useful as for filtration of crystals and a method for the manufacture of the permeable membrane.

Still another object of this invention is to provide a permeable membrane possessed of pores of a controlled diameter and enabled to recover albumin in a high ratio, remove pathogenic macromolecules with high efficiency, and treat a large amount of blood plasma and a method for the manufacture of the permeable membrane.

SUMMARY OF THE INVENTION

The objects described above are accomplished by a flat permeable membrane of polyolefin 10 to 500 μm in thickness, which permeable membrane has compacted layers of intimately bound fine particles of polyolefin formed on each in the opposite surface regions of the membrane and a layer of an aggregate of fine discrete particles of an average diameter of 0.01 to 5 μm formed between said compact layers and, consequently has fine through pores labyrinthically extended in the web of the direction of thickness of the membrane to establish communication between the opposite surfaces of the membrane.

The invention relates also to a flat permeable membrane wherein the combined thickness of the two compact layers accounts for not more than 30% of the entire thickness of the membrane. This invention also relates to a flat permeable membrane whose polyolefin membrane has a porosity in the range of 10 to 60%. This invention relates further to a flat porous membrane wherein the fine pores in the compacted layers have an average diameter in the range of 0.01 to 5 μm. This invention further relates to a flat permeable membrane wherein the fine particles in the layer of an aggregate of fine discrete particles have an average diameter in the range of 0.02 to 1.0 μm. Further this invention relates to a flat permeable membrane made of a polyolefin which is one member selected from the group consisting of polyethylene, polypropylene, and ethylenepropylene copolymer.

The objects described above are also accomplished by a method for the manufacture of a flat permeable membrane, which comprises mixing a polyolefin, a crystal seed forming agent, and an organic filler uniformly dispersible in the polyolefin in a molten state and easily soluble in an extractant to be used, discharging the resultant mixture in a molten state through a die, thereby cooling and solidifying the discharged membrane by contact thereof with a cooling fluid, and placing the resultant cooled and solidified flat membrane into contact with an extractant incapable of dissolving the polyolefin thereby removing the organic filler by extraction.

This invention relates also to a method for the manufacture of a flat permeable membrane, wherein the organic filler is a hydrocarbon having a higher boiling point than the polyolefin. This invention also relates to a method for the manufacture of a flat permeable membrane, wherein the hydrocarbon is a liquid paraffin or an α-olefin oligomer. This invention relates to a method for the manufacture of a flat permeable membrane, wherein the amount of the organic filler to be incorporated falls in the range of 35 to 300 parts by weight based on 100 parts by weight of the polyolefin. Further, this invention relates to a method for the manufacture of a flat permeable membrane, wherein the polyolefin is at least one member selected from the group consisting of polyethylene, polypropylene and ethylene-propylene copolymer. This invention relates further to a method for the manufacture of a flat permeable membrane, wherein the extractant is at least one member selected from the group consisting of alcohols and halogenated hydrocarbons. This invention relates to a method for the manufacture of a flat permeable membrane, wherein the cooling fluid is a liquid. Further, this invention relates to a method for the manufacture of a flat permeable membrane, wherein the liquid is a non-extractant. This invention further relates to a method for the manufacture of a flat permeable membrane, wherein the cooling fluid is an inert gas, especially air. This invention relates to a method for the manufacture of a flat permeable membrane, wherein the crystal seed forming agent is an organic heat-resisting substance having a melting point of not less than 150° C. and a gel point exceeding the temperature at which the polyolefin begins to crystallize. This invention further relates to a method for the manufacture of a flat permeable membrane, wherein the amount of the crystal seed forming agent to be incorporated is in the range of 0.1 to 5 parts by weight based on 100 parts by weight of the polyolefin.

DESCRIPTION OF PREFERRED EMBODIMENT

Figure 1:
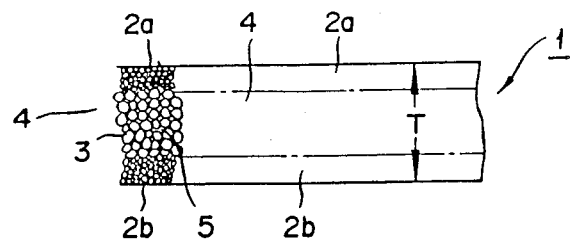
FIG. 1 is a model cross section of a flat permeable membrane according with the persent invention.

Now, this invention will be described specifically below with reference to the accompanying drawings. FIG. 1 represents a model cross section of a flat permeable membrane according with the present invention. As is apparent from the diagram, this is a flat polyolefin membrane 1 having a thickness, T, in the range of 10 to 500 μm, preferably 20 to 300 μm. Relatively compact layers 2a and 2b are formed on the opposite surface sides of this flat membrane 1. Between these compact layers 2a and 2b is formed a layer 4 in the form of an aggregate of a multiplicity of fine discrete particles 3 of a polyolefin having an average diameter in the range of 0.02 to 1.0 μm, with fine through pores 5 formed labyrinthically in the membrane to establish communication between the opposed surfaces of the membrane. The combined thickness of the two compact layers is desired not to exceed 30%, preferably to fall in the range of 0.1 to 5%, based on the total thickness of the membrane. These layers are desired to be as thin as permissible within the range indicated above.

Figure 2:
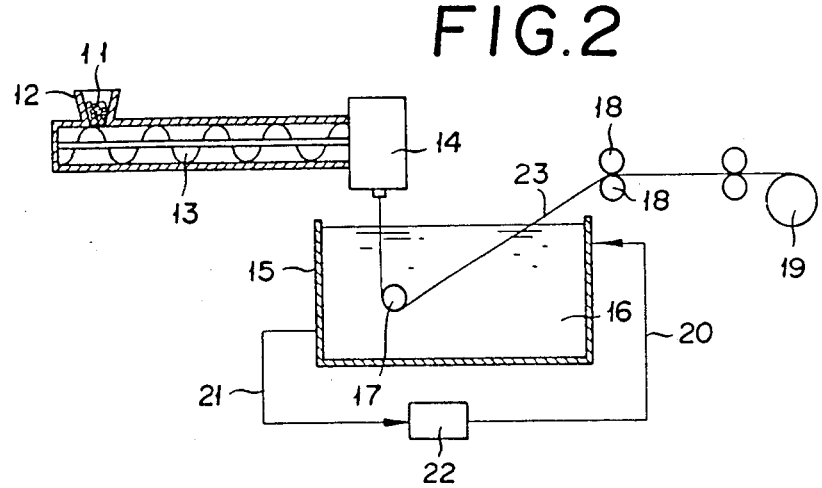
FIGS. 2 and 3 are schematic cross sections of apparatuses to be used in the manufacture of flat porous membranes according with the present invention.

The flat permeable membrane described above is produced, for example, as follows. As illustrated in FIG. 2, a mixture 11 of a polyolefin with an organic filler and a crystal seed forming agent is fed through a hopper 12 into a kneader such as, for example, a twin-screw type extruder 13, melted, kneaded, and extruded therethrough, forwarded to a T die 14, discharged therefrom in the form of a flat membrane, forwarded into contact with a cooling fluid (liquid) 16 held inside a cooling tank 15 to be solidified therein, then brought into contact with a roll 17 inside the cooling tank 15, thoroughly cooled while being passed inside the cooling tank 15, subsequently drawn with tension rolls 18 and 18, and thereafter taken up on a takeup roll 19. In the meanwhile, the cooling liquid 16 fed from a line 20 is discharged out of a line 21, then cooled to a prescribed temperature in a cooling device (such as, for example, a heat exchanger) 22, and put back to recirculation.

Figure 3:
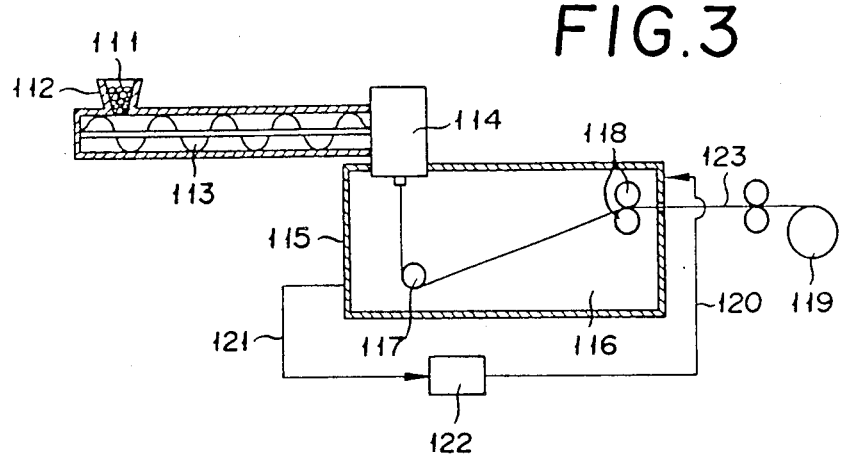

The case in which the cooling fluid to be used is in the form of liquid has been described. Where the cooling fluid to be used is in the form of an inert gas, the discharged membrane, as illustrated in FIG. 3, is solidified by being forwarded into contact with a cooling gas 116 inside a cooling chamber 115, brought into contact with a roll 117 inside the cooling chamber 115, thoroughly cooled and solidified during the travel inside the cooling chamber 115, subsequently drawn with tension rolls 118 and 118, and thereafter taken up on a takeup roll 119. In the meanwhile, the cooling gas 116 fed from a line 120 is discharged out of a line 121, then cooled to a prescribed temperature with a cooling device (such as, for example, a heat exchanger) 122, and put back to recirculation. In FIG. 3, the symbols denote identical or equivalent components to the components shown in FIG. 2 and have like numbers plus 100 to the numbers of FIG. 2.

The flat membrane 23 or 123 cooled and solidified as described above is taken up on the roll 19 or 119, then cut into pieces of a prescribed length, then immersed in an extractant to remove the organic filler by extraction, and dried when necessary. Consequently, there is obtained a flat porous membrane. The flat porous membrane obtained as described above is such that when it is subjected to a heat treatment, it is converted into a flat permeable membrane of sufficient dimensional stability.

The polyolefin to be used as the raw material in the present invention may be polypropylene or polyethylene, for example. It is desired to be of a grade having a melt index (M.I.) in the range of 5 to 70, preferably 15 to 65. In the polyolefins, polypropylene proves most desirable. In the various grades of polypropylene, those possessing higher degrees of crystallization prove more desirable than those possessing lower degrees of crystallization. The degree of crystallization represents the percentage by weight of the crystallized portion of a given polypropylene based on the total weight of the polypropylene and it is defined by X-ray diffraction, infrared absorption spectrum, or density. Generally, the vinyl type high polymer $-(CH_2-CHR)_n-$ can assume any of the three steric structures, i.e. isotactic and syndiotactic structures which have regularity and an atactic structure which has no regularity, depending on the location of the substitutent R. In a given polymer, the ease of crystallization increases in proportion as the proportion of the isotactic or syndiotactic structure increases. This rule also applies to polypropylene. The degree of crystallization of polypropylene proportionately increases with the proportion of the isotactic part of the polymer, namely, the degree of tacticity. In terms of tacticity, a criterion different from the degree of polymerization, the polypropylene to be used in the present invention is desired to have a tacticity of not less than 97%.

The organic filler is required to be uniformly dispersible in the polyolefin in a fused state and, at the same time, easily soluble in the extractant which will be described more fully afterward. Typical examples of the filler of the foregoing description include liquid paraffin (number-averaged molecular weight in the range of 100 to 2,000), α-olefin oligomers such as ethylene oligomer (number-averaged molecular weight in the range of 100 to 2,000), propylene oligomer (number-averaged molecular weight in the range of 100 to 2,000), and ethylene-propylene oligomer (number-averaged molecular weight in the range of 100 to 2,000), paraffin waxes (number-averaged molecular weight in the range of 200 to 2,500), and various hydrocarbons. The liquid paraffin proves particularly desirable.

The amount of the organic filler to be used is desired to fall in the range of 35 to 300 parts by weight, preferably 50 to 200 parts by weight, based on 100 parts by weight of the polyolefin.

If the amount of the organic filler is less than 35 parts by weight, the flat porous membrane produced fails to acquire a sufficient permeability to albumin. If this amount exceeds 300 parts by weight, the mixture to be processed into the flat membrane has too low viscosity to be extrusion molded in the form of a membrane. The raw material is prepared (designed) by the premixing method which comprises melting and mixing the components weighed out in prescribed proportions by the use of a twin-screw type extruder, for example, extruding the resultant molten mixture, and pelletizing the extruded mixture.

The crystal seed forming agent to be incorporated in the raw material in the present invention is an organic heat-resisting substance which has a melting point required to exceed 150° C. and desired to fall in the range of 200° to 250° C. and a gel point exceeding the temperature at which the polyolefin to be used begins to crystallize. The incorporation of the crystal seed forming agent in the raw material is aimed at decreasing the polyolefin particles in diameter and controlling the diameter of the pores to be formed by the organic filler incorporated in the raw material and subsequently removed therefrom by extraction. Typical examples of the crystal seed forming agent are 1,3,2,4-dibenzylidene sorbitol, 1,3,2,4-bis(p-methylbenzylidene)-sorbitol, 1,3,2,4-(p-ethylbenzylidene)-sorbitol, bis(4-t-butylphenyl)-sodium phosphate, sodium benzoate, adipic acid, talc, and kaolin.

Generally, the crystal seed forming agent is used for improving the transparency of the resin to be formed.

In the present invention, owing to the use of the crystal seed forming agent, the polyolefin particles can be shrunken to an extent that the diameter of the pores formed in the membrane will not be controlled by the diameter of the polyolefin particles and, as the result, the voids to be formed subsequently by the removal of the organic filler by extraction can be controlled to a diameter conforming with the objects of the membrane. The amount of the crystal seed forming agent to be incorporated in the raw material is required to fall in the range of 0.1 to 5 parts by weight, preferably 0.3 to 1.0 part by weight, based on 100 parts by weight of the polyolefin.

The raw material prepared by mixing the components as described above is melted and mixed with a twin-screw type extruder, for example, at a temperature in the range of 160° to 250° C., preferably 180° to 230° C. and discharged through a T die. The discharged molten mixture is allowed to fall into the cooling tank come into contact with the cooling fluid, and flow into contanct with the roll. At this point, the cooling temperature is not allowed to exceed 120° C. and is desired to fall in the range of 20° to 80° C. If this temperature exceeds 120° C., the speed of the crystallization of polyolefin is so lowered that fusion and conglomeration of the fine particles are accelerated and the porosity of the membrane is lowered and the fine through pores are enlarged in diameter. Consequently, the produced membrane acquired a texture incapable of removing pathogenic macromolecules and was highly susceptible to clogging.

The cooling fluid may be a liquid or an inert gas. A non-extracting liquid is used as the cooling liquid.

Typical examples of the non-extracting liquid usable as the cooling liquid include water, and aqueous solutions of zinc chloride, calcium chloride, and sodium chloride.

The inert gas usable advantageously as the cooling fluid is required to be inserted in the molten polyolefin to be cooled and solidified. Typical examples of the inert gas meeting this requirement are air, nitrogen, carbon dioxide gas, argon, helium, methane, and ethane.

The flat membranous web taken up is cut into pieces of prescribed dimensions and then kept immersed in the extractant until the organic filler is thoroughly extracted. Consequently, there are obtained flat permeable membranes.

The extractant to be used in this invention can be any of the substances capable of dissolving and extracting the organic filler without dissolving the polyolefin forming the membrane. Typical examples of the extractant are alcohols such as methanol, ethanol, propanols, butanols, hexanols, octanols, and lauryl alcohol, and halogenated hydrocarbons such as, 1,1,2-trichloro-1,2,2-trifluoroethane, trichlorofluoromethane, dichlorofluoromethane, and 1,1,2,2-tetrachloro-1,2-difluoroethane. In the extractants cited above, halogenated hydrocarbons prove desirable in terms of ability to extract the organic filler. From the standpoint of safety on the part of the human system, chlorofluoronated hydrocarbons prove particularly desirable.

The flat permeable membrane obtained as described above may be subjected to a heat treatment when necessary. This heat treatment is carried out in the atmosphere of such a gas as air, nitrogen, or carbon dioxide at a temperature in the range of 50° to 160° C., preferably 70° to 140° C. for a period of 1 to 120 minutes, preferably 2 to 60 minutes. This heat treatment stabilizes the structure of the membrane and improves the dimensional stability of the membrane. The membrane may be stretched prior to or during the heat treatment.

Figure 5:
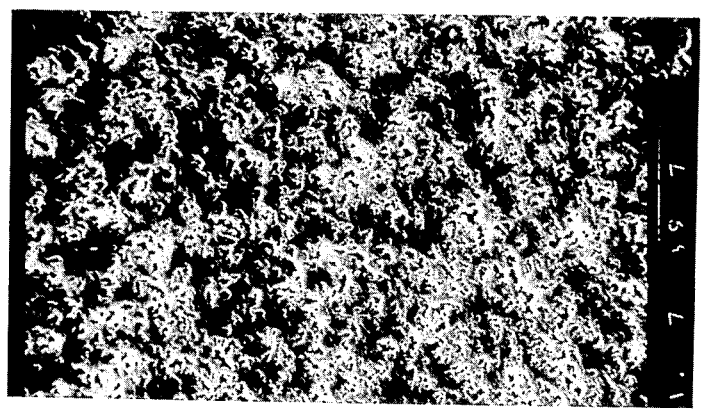
Figure 6:
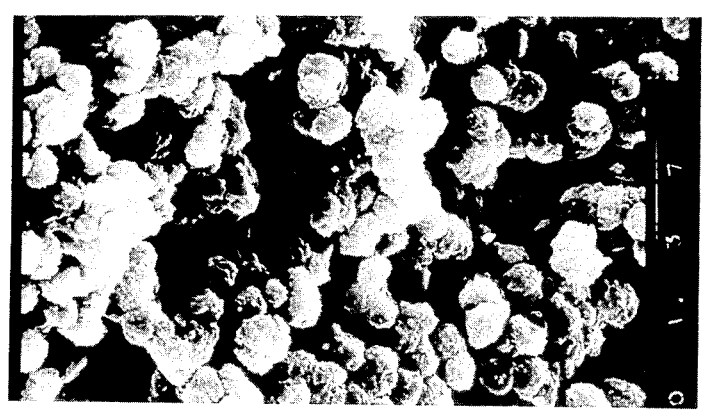

The flat permeable membrane which is obtained as described above is in the form of a sheet 10 to 500 μm, preferably 20 to 300 μm, in thickness. As concerns the structure of the flat permeable membrane, when water or other similar non-extracting liquid is used as the cooling fluid, fine particles of polyolefin are relatively intimately bound in the surface regions as clearly shown in FIG. 4 which is an electron photomicrograph at 3,000 magnifications. When air, nitrogen, or some other similar inert gas in used as the cooling fluid, fine particles of polyolefin are relatively intimately bound and numerous fine pores are also formed in the surface regions as clearly shown in FIG. 5. In either of the cases using different cooling fluids as mentioned above, a layer of an aggregate of fine discrete particles of polyolefin is formed between the two compact layers as clearly shown in FIG. 7 (using the crystal seed forming agent in an amount of 0.3 phr), FIG. 8 (using the crystal seed forming agent in an amount of 0.5 phr), and FIG. 9 (using the crystal seed forming agent in an amount of 1.0 phr). For comparison the cross section of a membrane using absolutely no crystal seed forming agent is illustrated in FIG. 6. In all the membranes now under discussion, while the fine particles near the opposite surfaces are intimately packed, the fine particles in the interior of the membrane have a larger diameter than those in the compact layers and the individual particles are bound in the form of an aggregate and the interstices of these fine particles form fine through pores labyrinthically extending to establish communication between the opposite surfaces of the membrane. The permeable membrane which is obtained as described above has a porosity in the range of 10 to 60%, preferably 30 to 60%. The permeable membrane is considered to be obtained in the construction described above probably for the following reason. The polyolefin mixed with the organic filler and the crystal seed forming agent is extruded in the form of a sheet and this sheet is allowed to fall into the cooling liquid. In this case, the extruded mixture of the polyolefin comes into contact with the cooling liquid on its surfaces. Thus, the solidification of the extruded mixture begins on the surfaces. Since the cooling occurs later on the interior of the membrane than on the surfaces thereof, the phase separation between the polyolefin and the organic filler proceeds within the membrane to an extent proportionate to the retardation of the cooling mentioned above, with the result that the organic filler which has been branched is concentrated to some extent. It is possibly because of this phenomenon that the membrane of the present invention possessing the peculiar construction having small pores in the surface regions and large pores in the interior of the membrane is formed.

Figure 10:
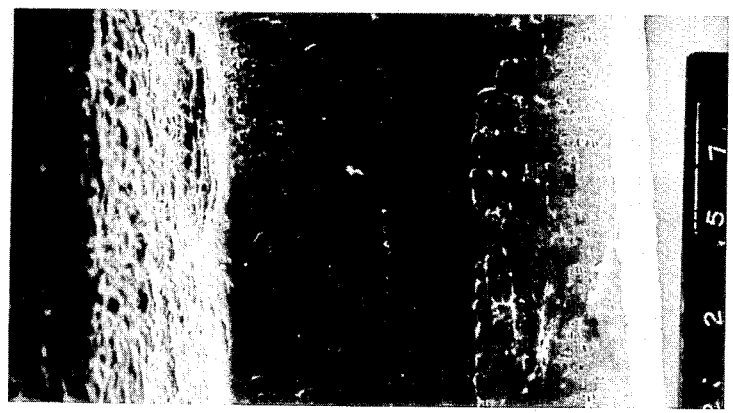
FIGS. 10 and 11 are electron photomicrographs illustrating the textures of commercially available porous membranes.
Figure 11:
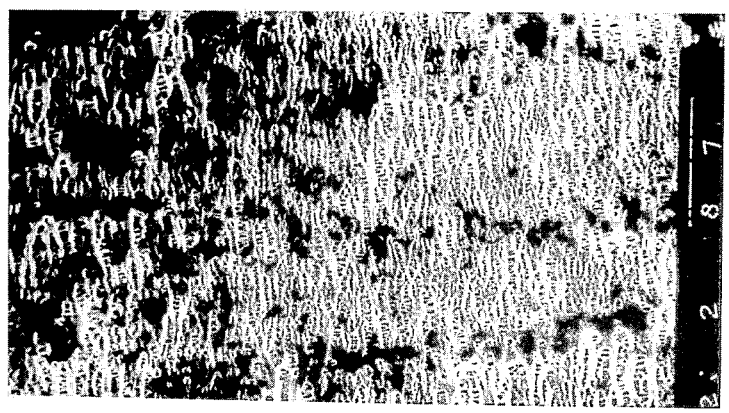

In the conventional flat membrane of polyolefin produced by the stretching method, no grains are present and fine pores are formed by cracks inflicted stretching as clearly shown in FIG. 10 representing a cross section and FIG. 11 representing a plan view.

The term "porosity" as used in the specification is defined and the method for its determination is indicated below. The definition of the term "average particle diameter" and the method for its determination are both indicated below.

1. Method for determination and definition of porosity

A given sample of flat membrane is immersed in ethanol. Then the ethanol is displaced with water to impregnate the membrane with water. The impregnated membrane is weighed (Wwet). Let Wdry stand for the weight of the membrane in its dry state and $\rho$ for the density of polymer in g/ml, and the porosity will be calculated by the following formula.

$$\text{Porosity} = \frac{\text{Volume of pores}}{\text{Volume of polymer portion}} \times 100(\%)$$
$$= \frac{(W\text{wet} - W\text{dry})}{(W\text{dry}/\rho) + (W\text{wet} - W\text{dry})} \times 100(\%)$$

2. Method for determination of average particle diameter

With the aid of a scanning electron microscope (Model JSM-50A or JSM-840, made by Japan Electron Optics Laboratory Co., Ltd.), 50 fine particles of a given sample viewed at 10,000 or 3,000 magnifications are measured in diameter and the 50 numerical values so found are averaged.

3. Method for determination of average pore diameter

With the aid of the scanning electron microscope, 100 pores of a given sample viewed at 10,000 (or 20,000) magnifications are measured in diameter and the 100 numerical values so found are averaged.

Now, the present invention will be described more specifically below with reference to working examples.

EXAMPLES 1 to 3

By the use of a twin-screw type extruder (product of Ikegai Iron Works, Ltd., marketed under model designation of "PCM-30-25"), 100 parts by weight of polypropylene having a M.I. of 23, 100 parts by weight of liquid paraffin (number-averaged molecular weight 324), and a varying amount of a crystal seed forming agent, either 1,3,2,4-diben-zylidene sorbitoal (product of E. C. Chemical Co., Ltd., marketed under trade designation "EC-1") or 1,3,2,4-bis(p-methylbenzylidene)-sorbitol (product of Shin-Nippon Rika K. K., marketed under trademark designation of "Gelol MD"), indicated in Table 1 were melted and mixed and then extruded. The extruded molten mixture was then pelletized. In an apparatus of the construction shown in FIG. 2, the pellets were melted with a twin-screw extruder (product of Ikegai Iron Works, Ltd., marketed under model designation of "PCM-30-25") 13 at 150° to 200° C., discharged through a T die 14 having a width of 0.6 mm at a rate of 60 g/min. into the ambient air and, at the same time, brought into contact with water held inside a cooling tank 15 disposed directly below the T die, cooled and solidified by being passed through the water over a distance of about 1.0 m, then drawn with tension rolls 18 and 18, and wound up on a takeup roll 19. The long sheet so wound up on the takeup roll 19 was cut into pieces of a fixed length, kept immersed in 1,1,2-trichloro-1,2,2-trifluoroethene (hereinafter referred to as "Freon 113") twice at 25° C. for 10 minutes to effect extraction of soluble components, then subjected to a heat treatment in the air at 130° C. for two minutes, and treated with an aqueous 50% ethanol solution to acquire hydrophilicity. Consequently, flat permeable membrane possessing the qualities shown in Table 1 were obtained.

EXAMPLES 4 and 5

Permeable membranes were produced by following the procedure of Example 1 in an apparatus constructed as shown in FIG. 3 in the same dimensions as the apparatus of Example 1, except that air was used in the place of water as the cooling fluid and the cooling was continued for two minutes. The results are shown in Table 1.

CONTROLS 1 and 2

A flat permeable membrane of polypropylene and a flat permeable membrane of polytetrafluoroethylene both produced by the stretching method and purchased in the market were tested similarly to Example 1. The results are shown in Table 1.

TABLE 1

Figure 4:
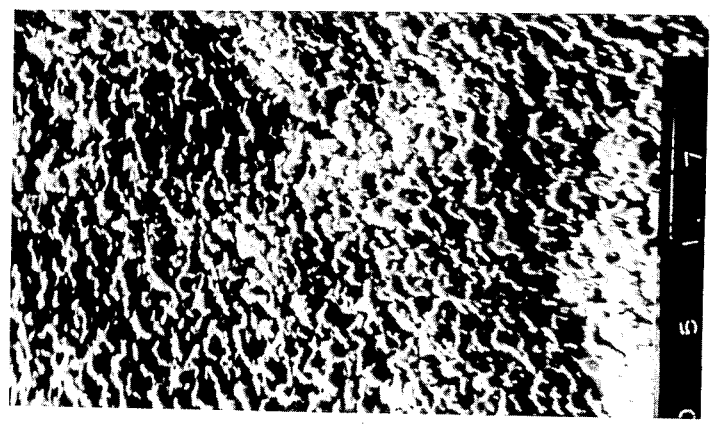
FIGS. 4 through 9 are electron photomicrographs illustrating the textures of flat porous membranes according with the present invention.
Figure 7:
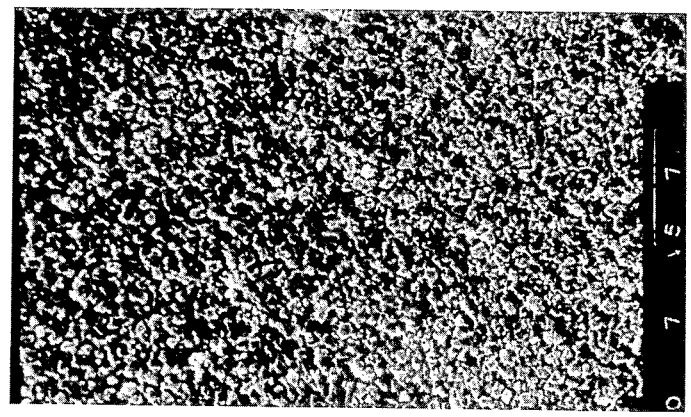
Figure 8:
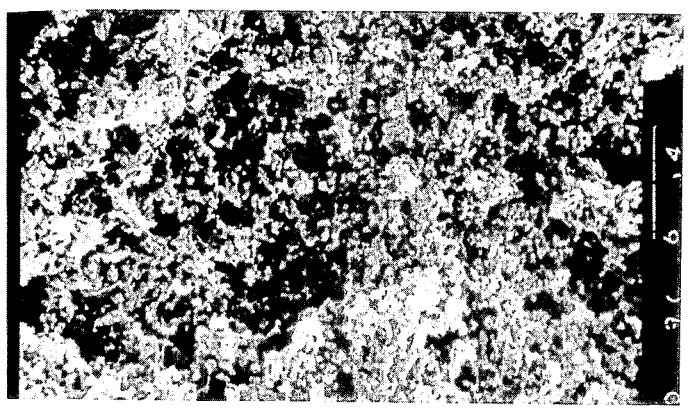
Figure 9:
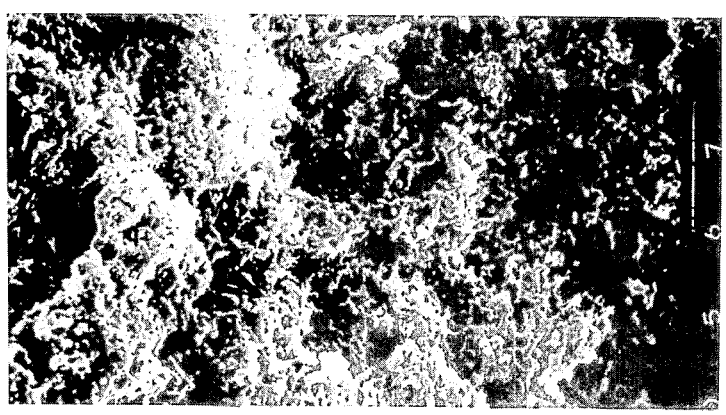

| Example | Crystal seed forming agent Type | Crystal seed forming agent Amount (phr) | Membrane forming conditions Cooling fluid | Membrane forming conditions Temperature (°C.) | Blue dextran test Permeability (%) | Blue dextran test Flux (ml/hr) (A) | Water flux (ml/min·mmHg·m²) (B) | Porosity (%) | Thickness of membrane (μm) | Blue dextran flux Water flux (A/B) | |
| --- | --- | --- | --- | --- | --- | --- | --- | --- | --- | --- | --- |
| 1 | EC-1 | 0.5 | Water | 50 | 0 | 7.8 | 0.6 | 35 | 150 | 13.0 | FIG. 4 FIG. 8 |
| 2 | EC-1 | 1.0 | Water | 49 | 6.8 | 10.0 | 0.7 | 41 | 150 | 14.3 | FIG. 9 |
| 3 | Gelol MD | 0.3 | Water | 48 | 0 | 6.6 | 1.3 | 30 | 150 | 5.1 | FIG. 7 |
| 4 | EC-1 | 0.5 | Air | −20 | 8.2 | 13.4 | 10.2 | 42 | 150 | 1.3 | |
| 5 | EC-1 | 1.0 | Air | −20 | 3.6 | 11.1 | 4.8 | 40 | 150 | 2.3 | |
| Control 1 | — | — | — | — | 0 | 9.4 | 5.0 | 40 | 30 | 1.9 | FIG. 10 |
| Control 2 | — | — | — | — | 0 | 3.3 | 0.46 | 20 | 90 | 7.2 | FIG. 11 |

The "blue-dextran test" indicated in Table 1 consisted in causing an aqueous solution of 0.05% by weight of blue-dextran 200 (product of Farmarcia, having a weightaveraged molecular weight of 2,000,000) to permeate a given sample membrane under application of pressure of 0.3 kg/cm² and measureing permeability of the membrane and the amount of the aqueous solution permeated during the first one hour of test. As a second filter for use in the plasma separator, the membrane is desired to exhibit a permeability as close to 0 as possible and as high a flux as possible in the aforementioned blue-dextran test. The blue-dextran flux is desired to be as high as possible because this constant increases in proportion as the degree of clogging of the membrane with the solute decreases.

The evaluation of membrane is effected based on the aforementioned factors coupled with the rating with bovine blood plasma to be described afterward.

EXAMPLES 6 and 7

Flat permeable membranes indicated in Table 2 were produced by following the procedure of Example 1 and tested for performance with bovine blood plasma. The results are shown in Table 3.

The test with the bovine blood plasma was carried out by preparing a mini-module of membrane 100 cm² (5×20 cm) in area and causing the bovine blood plasma obtained with a first filter in a plasma separator made by Terumo Kabushiki Kaisha to be filtered through the mini-module at a filtration speed of 12 ml/hr and a recirculation speed, u, of 280 cm/min. at 37° C.

The commercial products mentioned in the aforementioned controls were similarly tested.

Figure 12:
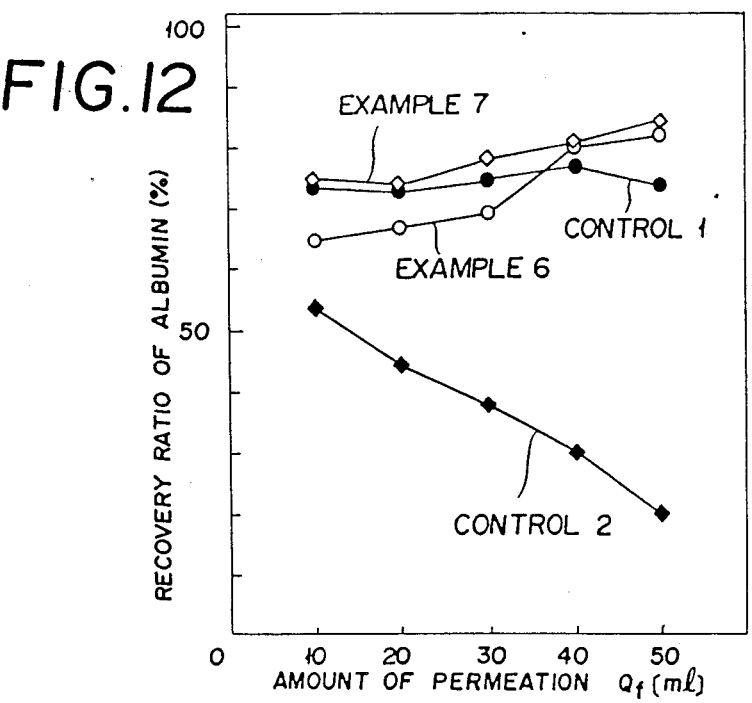
FIG. 12 is a graph showing the relation between the amount of permeation, Qf, and the ratio of recovery of albumin.
Figure 13:
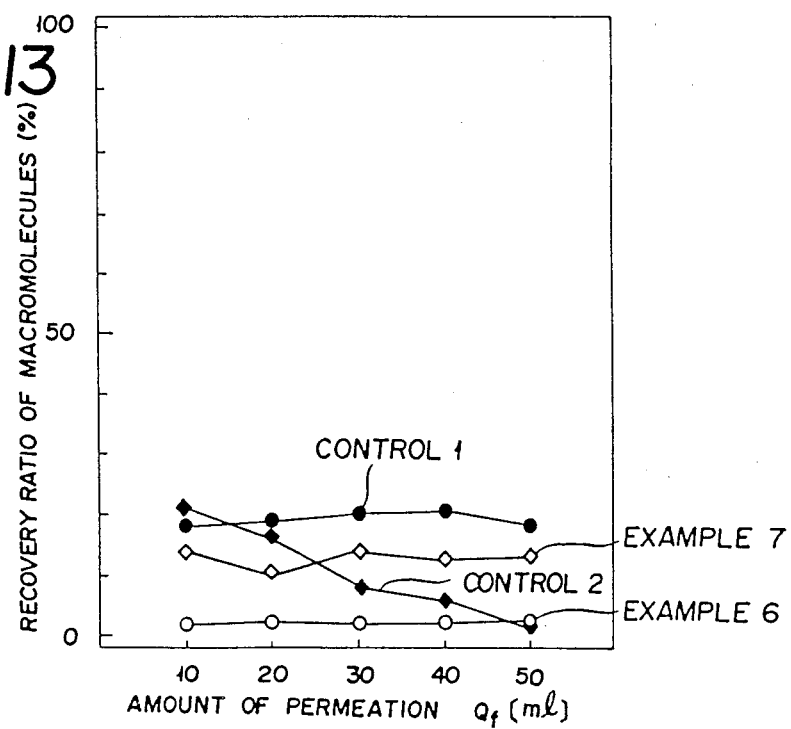
FIG. 13 is a graph showing the relation between the amount of permeation and the ratio of recovery of macromolecules.

By plotting the results obtained by the foregoing test, the results shown in FIGS. 12 and 13 were obtained.

TABLE 2

| | | Crystal seed forming agent | | |
| --- | --- | --- | --- | --- |
| Example | Paraffin (phr) | Type | Amount (phr) | Thickness of membrane (μm) |
| 6 | 100 | EC-1 | 0.5 | 160 |
| 7 | 100 | Gelol MD | 0.3 | 120 |

TABLE 3

| Example | $\Delta p^{(1)}$ (mmHg) | Ratio of recovery (%)$^{(2)}$ | | | A/M enhancement$^{(3)}$ (%) |
| --- | --- | --- | --- | --- | --- |
| | | Albumin | Globulin | Macromolecule | |
| 6 | 31 | 72.5 | 45.0 | 2.2 | 6570 |
| 7 | 10 | 78.1 | 59.2 | 12.8 | 518 |
| cON-TROL | | | | | |
| 1 | 89 | 74.9 | 60.3 | 19.4 | 287 |
| 2 | 102 | 38.0 | 26.7 | 10.2 | 372 |

$^{(1)}\Delta p = P_{qF} = 50 - P_{qF} = 10$
$^{(2)}Q_f$ = Average value up to 50 (ml)
$^{(3)}[(A/M \text{ of filtrate})/(A/M \text{ of blood plasma})-1] \times 100(\%)$ As described above, this invention is directed to a flat permeable membrane of polyolefin of 10 to 500 μm in thickness, which permeable membrane has compact layers of intimately bound fine particles of polylefin formed one each in the opposite surface regions of the membrane and a layer of an aggregate of fine discrete particles of an average diameter of 0.01 to 5 μm formed between the compact layers and, consequently, has fine through pores labyrinthically extended in the direction of thickness of the membrane to establish communication between the opposite surfaces of the membrane. The fine through pores do not linearly penetrate the membrane in the direction of its thickness but comprise numerous fine pores formed and mutually connected between the fine particles as extended from one surface through the interior of the membrane to the other surface. Thus, the fine through pores enjoy extremely high uniformity. When this membrane is used for the separation of blood plasma, therefore, desired removal of pathogenic macromolecules can be attained with high efficiency while suffering clogging and pressure loss minimally and the recovery of albumin is obtained at a high ratio. Thus, the membrane exhibits outstanding stability to resist aging. It, accordingly, proves highly useful for the separation of blood plasma, especially as a secondary filter for the separation of blood plasma.

This invention is further directed to a method for the manufacture of a flat permeable membrane, which comprises mixing a polyolefin, a crystal seed forming agent, and an organic filler uniformly dispersible in the polyolefin in a molten state and easily soluble in an extractant to be used, discharging the resultant mixture in a molten state through a die, cooling and solidifying the discharged molten membrane by contact thereof with a cooling fluid, and placing the resultant cooled and solified flat membrane into contact with an extractant incapable of dissolving the polyolefin thereby removing the organic filler by extraction. During the course in which the raw material for the membrane which the raw material for the membrane which has been melted and transformed into a uniformly dispersed solution is cooled and solidified, the fine pores are formed between the fine particles of polyolefin by causing phase separation between the polyolefin and the organic filler in the raw material and extracting the organic filler therefrom. Further, the crystal seed forming agent incorporated in the raw material promotes size reduction of the polyolefin particles, allows the pores subsequently formed in consequence of the removal of the organic filler by extraction to be controlled to a diameter meeting the object of the invention, and facilitates the production of a flat permeable membrane contemplated by the present invention. Further, the phase separation can be controlled in the direction of thickness of the membrane by suitably selecting the amount of the organic filler and that of the crystal seed forming agent to be incorporated, the cooling temperature, the type of the cooling fluid, and the solubility of the organic filler relative to the cooling fluid.

What is claimed is:

1. A method for manufacturing a flat permeable membrane, which method comprises:
   mixing a molten polyolefin, a crystal seed forming agent, and an organic filler uniformly dispersible in said molten polyolefin and easily soluble in an extractant to be used,
   discharging the resultant mixture in a molten state through a die to obtain a molten membrane,
   cooling and solidifying the discharged molten membrane by contacting said molten membrane with a cooling fluid, and
   removing said organic filler by contacting the cooled and solidified membrane with an extactant capable of dissolving the organic filler but incapable of dissolving said polyolefin and said crystal forming agent.

2. A method according to claim 1, wherein said organic filler is a hydrocarbon having a boiling point not less than the melting point of said polyolefin.

3. A method according to claim 2, wherein said hydrocarbon is liquid paraffin.

4. A method according to claim 2, wherein said method
   said hydrocarbon is an α-olefin oligomer selected from the group consisting of ethylene oligomers, propylene oligomers, and ethylene-propylene oligomers; and
   35 to 40 parts by weight of a said crystal seed forming agent are used and said crystal seed forming agent is selected from the group consisting of dibenzylidene sorbitol, 1,3,2,4-bis(p-methylbenzylidene)-sorbitol, 1,3,2,4-(p-ethylbenzylidene)-sorbitol, bis (4-t-butylphenyl)-sodium phosphate, adipic acid and kaolin.

5. A method according to claim 1, wherein the amount of said organic filter used is in the range of 35 to 300 parts by weight based on 100 parts by weight of said polyolefin.

6. A method according to claim 1, wherein said polyolefin is at least one member selected from the group consisting of polyethylene, polypropylene, and ethylene-propylene copolymer.

7. A method according to claim 1, wherein said crystal seed forming agent is an organic heat-resisting substance having a melting point of not less than 150° C. and a gel point not less than the temperature at which said polyolefin begins to carystallize.

8. A method according to claim 1, wherein the amount of said crystal seed forming agent to be used is in the range of 0.1 to 5 parts by weight based on 100 parts by weight of said polyolefin.

9. A method according to claim 1, wherein said extractant is at least one member selected from the group consisting of alcohols and halogenated hydrocarbons.

10. A method according to claim 1, wherein said cooling fluid is a liquid.

11. A method according to claim 1, wherein said cooling liquid is incapable of dissolving said organic filler.

12. A method according to claim 1, wherein said cooling fluid is an inert gas.

13. A method according to claim 12, wherein said inert gas is air.

14. A method according to claim 1, wherein the temperature for cooling and solidifying is not more than 120° C.

15. A method according to claim 1, wherein said cooling liquid is water.

16. A method according to claim 1, wherein said polyolefin has more than 97% of tacticity.

17. A method according to claim 1, wherein said crystal forming agent is 1,3,2,4-dibenzylidene-sorbitol or 1,3,2,4-bis (p-methylbenzylidene)-sorbitol.

18. A flat permeable membrane produced in accordance with the process of claim 1 for removing pathogenic macromolecules from blood plasma compositions.

* * * * *